US012760593B2

(12) United States Patent
Chauhan

(10) Patent No.: US 12,760,593 B2
(45) Date of Patent: Oct. 13, 2026

(54) CHAIN PROTECTION SYSTEM

(71) Applicant: ROLLEASE ACMEDA, INC., Stamford, CT (US)

(72) Inventor: Oliver Chauhan, Broadmeadows (AU)

(73) Assignee: ROLLEASE ACMEDA, INC., Stamford, CT (US)

( * ) Notice: Subject to any disclaimer, the term of this patent is extended or adjusted under 35 U.S.C. 154(b) by 159 days.

(21) Appl. No.: 18/389,972

(22) Filed: Dec. 20, 2023

(65) Prior Publication Data

US 2024/0209684 A1 Jun. 27, 2024

(30) Foreign Application Priority Data

Dec. 22, 2022 (AU) ................................ 2022903958

(51) Int. Cl.

| | |
|---|---|
| ***E06B 9/32*** | (2006.01) |
| ***E06B 9/326*** | (2006.01) |
| ***E06B 9/42*** | (2006.01) |
| *E06B 9/78* | (2006.01) |

(52) U.S. Cl.

CPC ................ *E06B 9/326* (2013.01); *E06B 9/42* (2013.01); *E06B 2009/785* (2013.01)

(58) Field of Classification Search

CPC ...... E06B 9/326; E06B 9/42; E06B 2009/785; E06B 9/78; F16H 7/18

See application file for complete search history.

(56) References Cited

U.S. PATENT DOCUMENTS

| | | | | |
|---|---|---|---|---|
| 4,932,456 | A * | 6/1990 | Buxbaum ............... | E06B 9/324 160/300 |
| 2019/0186198 | A1* | 6/2019 | Kirby ........................ | E06B 9/78 |
| 2019/0195014 | A1* | 6/2019 | Chua ........................ | E06B 9/326 |
| 2020/0032582 | A1 | 1/2020 | Graham et al. | |
| 2024/0247542 | A1* | 7/2024 | Marocco ................. | E06B 9/326 |
| 2024/0271485 | A1* | 8/2024 | Guerra .................... | E06B 9/326 |

FOREIGN PATENT DOCUMENTS

| | | | |
|---|---|---|---|
| CA | 3100301 | C | 3/2022 |
| EP | 2458128 | A1 | 5/2012 |
| KR | 20110106248 | A | 9/2011 |
| WO | 2017219071 | A1 | 12/2017 |
| WO | 2021003547 | A1 | 1/2021 |

OTHER PUBLICATIONS

International-Type Search Report issued from the Australian Patent Office for related National Application No. 2022903958, mailed Sep. 14, 2023; 9 pages.

* cited by examiner

*Primary Examiner* — Beth A Aubrey

(74) *Attorney, Agent, or Firm* — HAYNES AND BOONE, LLP

(57) ABSTRACT

A chain protection system for a chain driven blind assembly is provided. The chain protection system includes an elongate rod for supporting a blind, a drive means connected to the rod and configured to rotate the rod about a longitudinal axis to extend and retract the blind in use, a chain loop, an elongate body having a cavity configured to receive a portion of the chain loop, and a rotatable member mounted within the cavity of the body and configured to receive the chain loop of the blind assembly such that a predetermined length of the chain loop extends from the cavity of the body during operation of the chain driven blind assembly.

19 Claims, 8 Drawing Sheets

CHAIN PROTECTION SYSTEM

CROSS REFERENCE TO RELATED APPLICATION

This application claims the benefit of the filing date of, and priority to, Australian Provisional Patent Application Number 2022903958, filed Dec. 22, 2022, the entire disclosure of which is hereby incorporated herein by reference.

TECHNICAL FIELD

The present disclosure relates to a chain protection system for a chain driven blind assembly. The system may be used to prevent the loop of a chain that forms part of a blind assembly becoming entangled around the neck of a child.

BACKGROUND ART

A chain driven blind assembly includes a component that is rotatable to extend and retract a window blind. Such assemblies typically have a drive mechanism that is rotatable about a spindle, and engages a cord, such as a beaded cord or chain. Operation of the cord causes the drive mechanism to rotate about the spindle. For example, the cord may be pulled on one side to rotate the fitting in first direction to extend the blind, and the cord may be pulled on another side to rotate the fitting in second direction to retract the blind.

The chain of a chain driven blind assembly forms a loop which hangs from the assembly to facilitate operation of the blind by the hand of a user. A problem with a hanging cord loop is that it presents a safety risk, particularly for children. For example, the loop may become entangled around the neck of a child and present a strangulation risk.

A number of solutions have been proposed to mitigate against this risk. One such solution has been to add a plastic shroud onto the chain. The length of the shroud ensures that a set length of chain (typically 8 inches) is exposed when the shroud is manually lifted by a user. The user manually lifts the shroud to expose the bottom portion of the chain to thereby operate the blind assembly.

In this specification, unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

Disclosed herein is a chain protection system for a chain driven blind assembly. The blind assembly may comprise an elongate rod for supporting a blind, the rod extending along a longitudinal axis of the blind assembly between first and second ends of the rod, the first and second ends of the rod being configured to support the blind assembly, a drive means connected to the rod and configured to rotate the rod about the longitudinal axis to extend and retract the blind in use, and a chain loop that extends along a longitudinal axis of the chain loop between proximal and distal ends of chain loop, the proximal end of the chain being connected to the drive means. The chain protection system may comprise; an elongate body that extends along a longitudinal axis of the body between proximal and distal ends of the body, the body comprising an outer wall that defines a cavity therein, the cavity being configured to receive a portion of the chain loop that is disposed towards the proximal end of the chain loop such that the portion of the chain loop is inhibited from operation by a user's hand; and a rotatable member mounted within the cavity of the body and configured to receive the chain loop of the blind assembly such that a predetermined length of the chain loop disposed at the distal end of the chain loop extends from the cavity of the body during operation of the chain driven blind assembly, the predetermined length of the chain loop extending from the cavity being freely accessible by a user's hand to operate the chain loop.

In some forms, the chain loop engages the drive means at the proximal end of the chain loop, and the predetermined length of the chain loop is disposed at the distal end of the chain loop.

In some forms, the proximal end of the body is disposed towards the proximal end of the chain loop, and the distal end of the body is disposed towards the distal end of the chain loop.

In some forms, the chain loop engages first and second opposing sides of the rotatable member such that the predetermined length of chain remains a consistent length during operation.

In some forms, the chain loop extends from the first side of the rotatable member and from the cavity of the body, and returns to engage the second side of the rotatable member.

In some forms, the rotatable member is mounted in a fixed position within the cavity of the body.

In some forms, the rotatable member comprises a first aperture formed therethrough, and the body comprises a second aperture formed therethrough, the first and second apertures being disposed along an axis of rotation of the rotatable member.

In some forms, the system may comprise a pin that extends through the first and second apertures and thereby rotatably mounts the rotatable member to the elongate body.

In some forms, the elongate body comprises a shroud extending between first and second ends of the shroud, and a funnel member mounted to the first or second end of the shroud.

In some forms, the shroud comprises a first wall, a second wall spaced from and parallel to the first wall, a third wall connecting the first and second walls on a first side of the shroud, and a fourth wall connecting the first and second walls on a second side of the shroud.

In some forms, the first, second, third and fourth walls of the shroud surround a first portion of the cavity of the elongate body.

In some forms, the first and second walls of the shroud are flat, and the third and fourth walls of the shroud are curved, such that the profile of the shroud is oblong.

In some forms, the funnel member may comprise: an extension portion having a cross sectional area that is smaller than a cross sectional area of the shroud, the extension portion being configured to be received by the shroud; and a head portion that is disposed at an end of the extension portion, the head portion being configured to extend from the shroud.

In some forms, the head portion has a cross sectional area that is equal to or greater than the cross sectional area of the shroud, the head portion being configured to sit against an end of the shroud.

In some forms, the head portion comprises a lip that extends perpendicular to the longitudinal axis of the body, and a curtain portion that projects from the lip parallel to the longitudinal axis of the body.

In some forms, the curtain and lip of the head portion together form a recess configured to receive an end of the shroud.

In some forms, the head portion and extension portion comprise a channel formed therethrough that forms part of the cavity of the body, the channel being configured to receive the chain loop.

In some forms, the head portion is open at a first end of the head portion such that the channel of the head portion is able to receive the chain loop from the extension portion, and is open at a second end of the head portion such that the chain loop extends from head portion.

In some forms, the head portion and extension portion comprise a guide member disposed centrally in the channel, the guide member extending along the longitudinal axis of the body and configured to guide the chain loop in use.

In some forms, the extension portion comprises a support configured to support the rotatable member.

In some forms, the support is circular in profile, and the second aperture of the body is disposed through the support.

In some forms, the pin extends through the support and thereby rotatably mounts the rotatable member to the support.

In some forms, the head portion comprises a seat configured to support the rotatable member.

In some forms, the seat is circular in profile.

In some forms, a pin extends through the extension portion and thereby mounts the funnel member to the shroud.

In some forms, the funnel member is mounted to an end of the shroud that is disposed towards the drive means of the chain driven blind assembly in use.

In some forms, the funnel member is mounted to an end of the shroud that is disposed away from the drive means of the chain driven blind assembly in use.

In some forms, the system comprises two funnel members, the first of the two funnel members being mounted to an end of the shroud that is disposed away from the drive means of the chain driven blind assembly in use, the second of the two funnel members being mounted to an end of the shroud that is disposed towards the drive means of the chain driven blind assembly in use.

In some forms, the rotatable member comprises a mounting portion and a plurality of chain receivers that are integrally formed with and extend from the mounting portion, the chain receivers each being configured to receive a link of the chain loop and to thereby rotate the rotatable member upon operation of the chain loop.

In some forms, the plurality of chain receivers are evenly spaced about a circumference of the mounting portion.

In some forms, the plurality of chain receivers are disposed adjacent an inner wall of the body to prevent the chain loop from passing the rotatable member without rotating the rotatable member.

There is also disclosed herein a chain driven blind assembly incorporating a chain protection system. The blind assembly may comprise an elongate rod for supporting a blind, the rod extending along a longitudinal axis of the blind system assembly between first and second ends of the rod, the first and second ends of the rod being configured to support the blind assembly, a drive means connected to the rod and configured to rotate the rod about the longitudinal axis to extend and retract the blind in use, and a chain loop that extends along a longitudinal axis of the chain loop between proximal and distal ends of chain loop, the proximal end of the chain being connected to the drive means. The chain protection system may comprise; an elongate body that extends along a longitudinal axis of the body between proximal and distal ends of the body, the body comprising an outer wall that defines a cavity therein, the cavity being configured to receive a portion of the chain loop that is disposed towards the distal proximal end of the chain loop such that the portion of the chain loop is inhibited from operation by a user's hand; and a rotatable member mounted within the cavity of the body and configured to receive the chain loop of the blind assembly such that a predetermined length of the chain loop disposed at the distal end of the chain loop extends from the cavity of the body during operation of the chain driven blind assembly, the predetermined length of the chain loop extending from the cavity being freely accessible by a user's hand to operate the chain loop.

BRIEF DESCRIPTION OF DRAWINGS

Various embodiments/aspects of the disclosure will now be described with reference to the following figures.

DETAILED DESCRIPTION

The Applicant has determined that there are several problems associated with existing solutions that mitigate against the above described risks associated with chain driven blind assemblies. This is particularly the case for the solution that involves adding a plastic shroud onto the chain. Firstly, as the shroud obscures the portion of chain that is operable by a user, the user may be confused with respect to how to operate the chain. Secondly, the user must continue to raise the shroud during operation to maintain access to the chain. This results in the user operating the chain with one hand while continuing to raise the shroud with another. This results in operation of the blind assembly being relatively difficult, and at worst may result in an injury to the user (e.g. if the shroud is released during operation).

The solution disclosed herein is a shroud that stays in the raised position. The disclosed solution utilises a wheel (housed within or attached to the shroud) that engages both sides of the chain loop. This wheel is free spinning Advantageously, this solution ensures that a predetermined length of chain, being the portion of the chain operated by a user, remains below the shroud and is freely accessible by a user.

A chain protection system for a chain driven blind assembly will now be described in detail with reference to FIGS. 1 to 8. The blind assembly (not shown) includes an elongate rod, in the form of a tube, for supporting a blind (e.g. a sheet of material, such as fabric, used to cover a window). The tube extends along a longitudinal axis of the blind system between first and second ends of the tube. The first and second ends of the tube are configured to support the blind assembly (e.g. may be mounted to brackets disposed on either side of a window). The assembly includes a drive means connected to the tube. The drive means is configured to rotate the tube about the longitudinal axis of the blind assembly to extend and retract the blind in use (e.g. to unwind, and wind up, a sheet of fabric). The blind assembly includes a chain loop that extends along a longitudinal axis of the chain loop (this axis is substantially perpendicular to the longitudinal axis of the blind, as the chain hangs from the drive assembly via gravity) between proximal and distal ends of chain loop. The proximal end of the chain is connected to and drives the drive means (e.g. when a user pulls one side of the exposed chain loop to retract or extend the blind). The user typically operates the distal end of the chain loop (e.g. the portion of the loop that is spaced from the tube).

Figure 1:
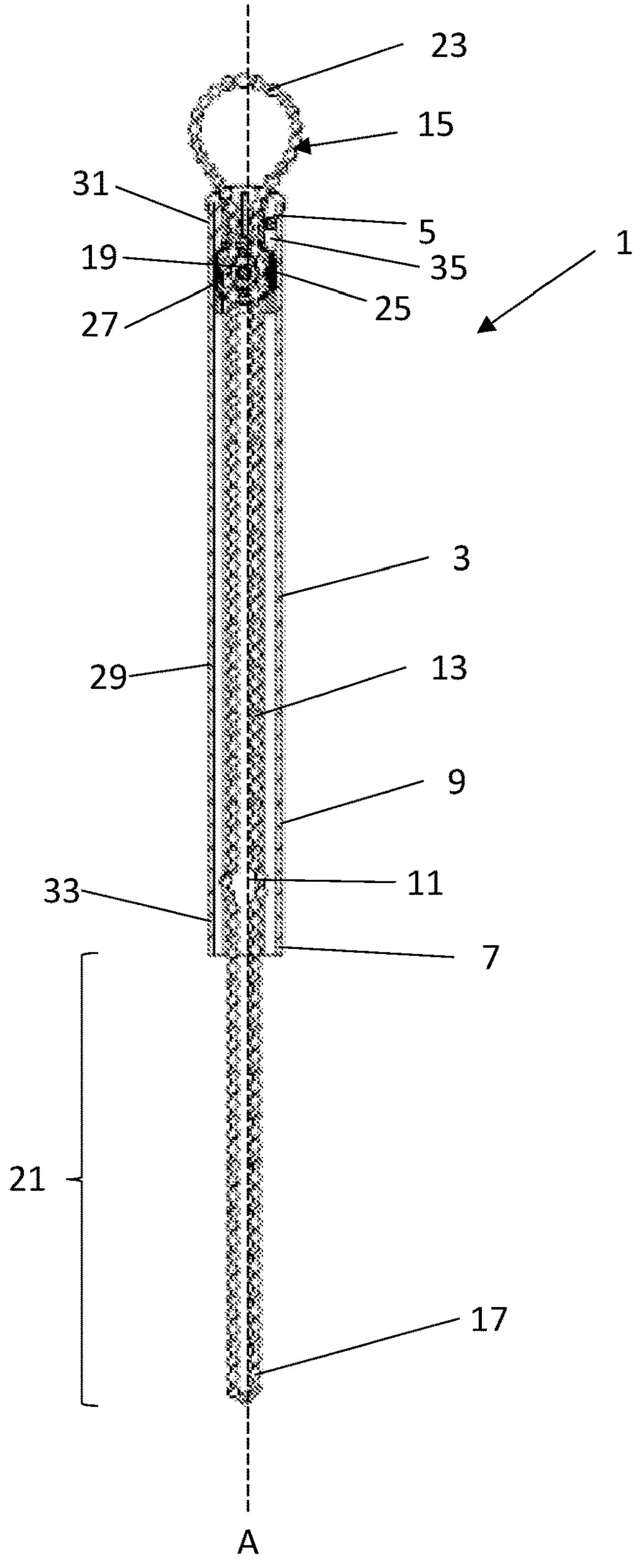
FIG. 1 shows a cross sectional front view of a chain protection system according to a first embodiment of the present disclosure.

A chain protection system 1 will now be described with reference to FIG. 1, which provides a cross sectional front view of chain protection system according to a first embodiment of the present disclosure.

The system 1 includes an elongate body 3 that extends along a longitudinal axis A of the body 3 between proximal 5 and distal 7 ends of the body 3. The body 3 includes an outer wall 9 that defines a cavity 11 therein, the cavity 11 being preferably configured to house and conceal therein a portion 13 of the chain loop 15 that is disposed towards the proximal end 17 of the chain loop 15 such that the portion of the chain loop 15 housed within the cavity 11 is not accessible to the hand of a user. The proximal end 5 of the body 3 is in use preferably positioned and maintained immediately underneath the drive means about which the proximal end of the chain is looped.

The system 1 includes a rotatable member 19 mounted within the cavity 11 of the body 3. The rotatable member 19 is configured to receive the chain loop 15 such that a predetermined length 21 of the chain loop 15 disposed at the distal end 17 of the chain loop 15 extends from the cavity 11 of the body 3 during operation of the blind assembly. In the detailed embodiment, the predetermined length is 8 inches, and the system 1 is configured to expose no more or less than 8 inches of the chain loop 15 during operation of the blind assembly. As will be evident to the skilled addressee, the system 1 could be positioned so as to attain a different predetermined length of chain loop that extends from the body (e.g. to meet the regulations of a particular jurisdiction).

The chain loop 15 engages the drive means of the blind assembly at a proximal end 23 of the chain loop 15, and the predetermined length 21 of the chain loop 15 is disposed at the distal end 17 of the chain loop 15. The proximal end 5 of the body 3 is disposed towards the proximal 23 end of the chain loop 15, and the distal end 7 of the body 3 is disposed towards the distal end 17 of the chain loop 15.

The chain loop 15 engages first 25 and second 27 opposing sides of the rotatable member 19 such that the predetermined length 21 of chain loop 15 remains a consistent length during operation and the elongate body 3 is held in a raised position immediately adjacent the drive means of the blind assembly.

The chain loop 15 extends from the first side 25 of the rotatable member 19 and from the cavity 11 of the body 3, and returns to engage the second side 27 of the rotatable member 19. In other words, the chain 15 passes and engages the first side 25 of rotatable member 19, extends from the first side 25 of the rotatable member 19 (as opposed to looping around the rotatable member), forms the predetermined length of chain 21 which hangs freely from the system 1, and then passes back to the engage the second side 27 of the rotatable member 19, before extending from the second side 27 of the rotatable member 19 and returning to the drive mechanism of the blind assembly. In this respect, the system 1 in one form may include only one rotatable member 19 to minimise friction and thereby the effort needed by a user to pull on the chain to operate the blind. Operation of the chain, by pulling on the exposed loop of chain at the distal end 17 of the chain, rotates the rotatable member 19. To ensure that a consistent predetermined length 21 of chain 15 remains exposed for operation of the blind assembly, the rotatable member 19 is mounted in a fixed position within the cavity 11 of the body 3.

The elongate body 3 includes a shroud 29 extending between first 31 and second 33 ends of the shroud 29. The shroud is configured to cover a portion of the chain loop 15 in use. The body 3 also includes a funnel member 35 mounted to the second end 33 of the shroud 29. As will be evident to the skilled addressee, the funnel member 35 could be mounted to the first 31 or second 33 ends of the shroud 29. The cavity 11 extends though the length of both the shroud 29 and funnel member 35 such that the chain loop passes through the body 3 (formed from both the shroud 29 and the funnel member 35).

Figure 2:
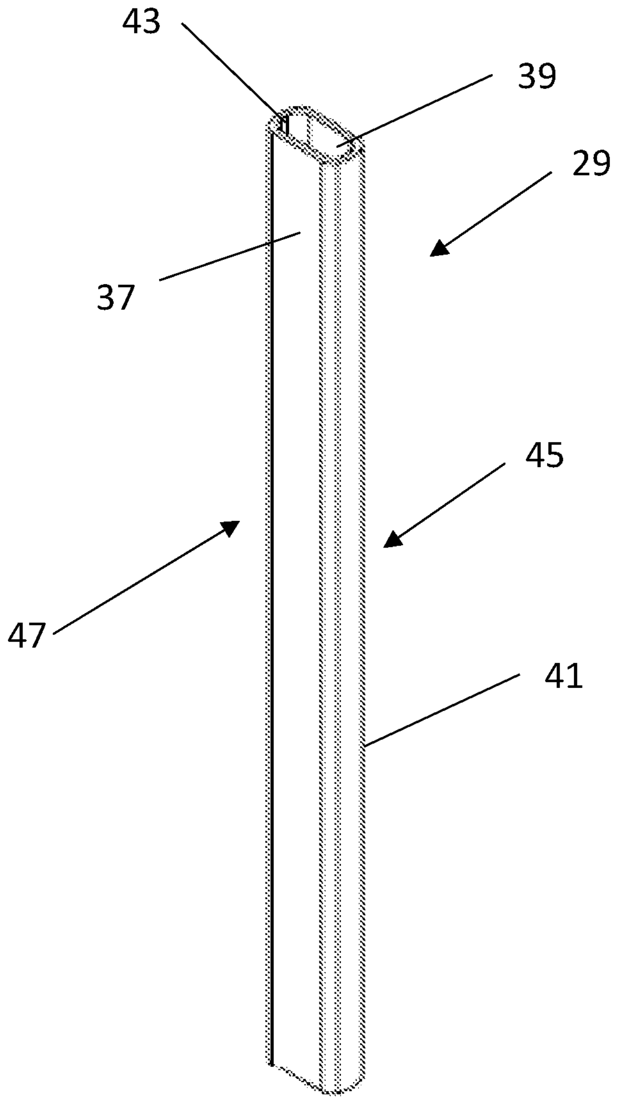
FIG. 2 shows a front perspective view of the shroud of the chain protection system of FIG. 1.

FIG. 2 provides a front perspective view of the shroud 29. The shroud 29 includes a first wall 37, a second wall 39 spaced from and parallel to the first wall 37, a third wall 41 connecting the first 37 and second 39 walls on a first side 45 of the shroud 29, and a fourth wall 43 connecting the first 37 and second 39 walls on a second side 47 of the shroud 29. The first 37, second 39, third 41 and fourth 43 walls of the shroud 29 surround a first portion of the cavity 11 of the body 3. The first 37 and second 39 walls of the shroud 29 are flat, and the third 41 and fourth 43 walls of the shroud 29 are curved, such that the profile of the shroud 29 is oblong in profile. As will be evident to the skilled addressee, an alternate shape could be employed for the shroud to suit a particular chain or application.

Figure 3:
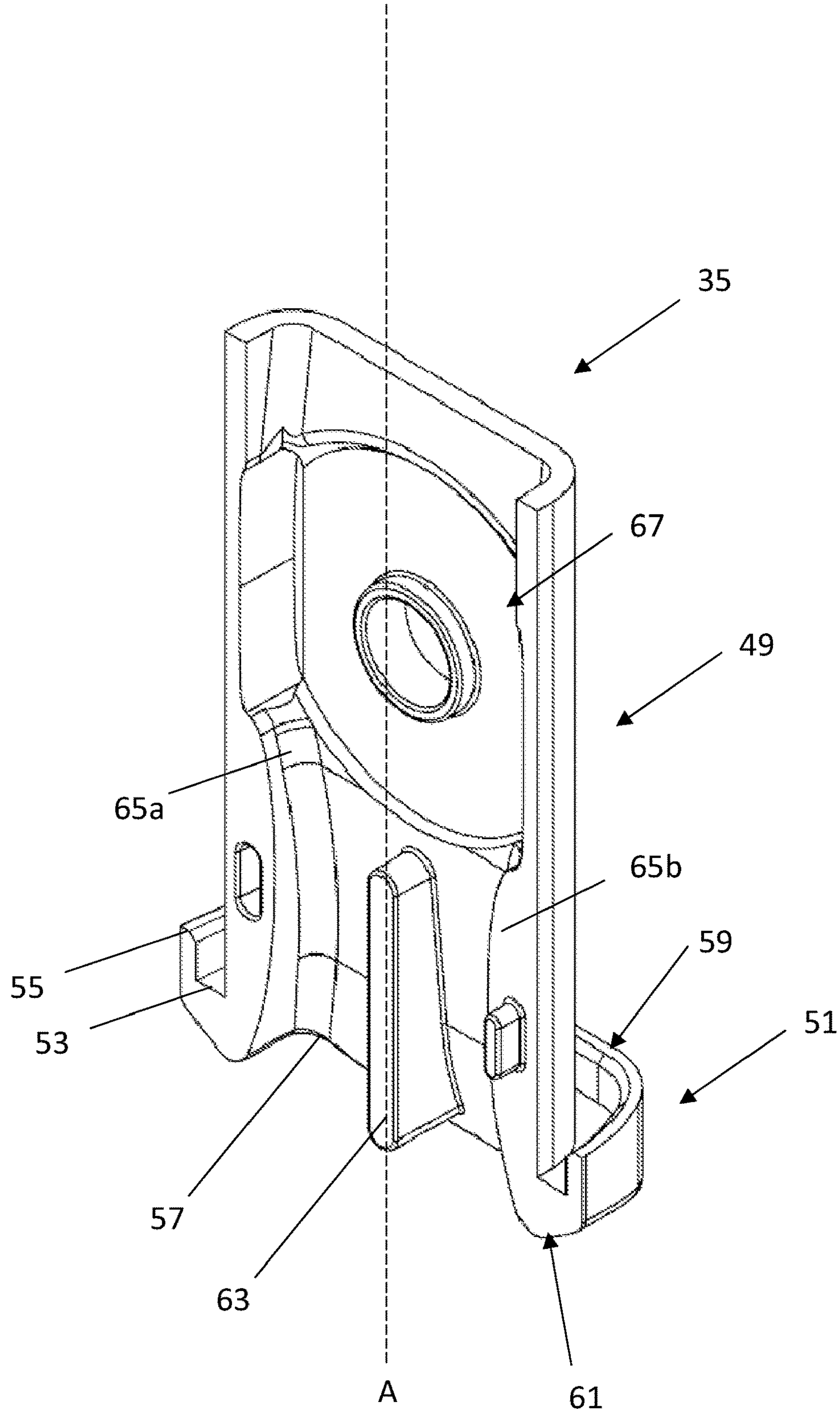
FIG. 3 shows a cross sectional front view of a first embodiment of the funnel member.

A first embodiment of the funnel member 35 will now be described with reference to FIG. 3, which provides a cross sectional front view of the first embodiment of the funnel member 35.

The funnel member 35 includes an extension portion 49. The extension portion 49 has a cross sectional area that is smaller than a cross sectional area of the shroud 29. The extension portion 49 is configured to be received by the shroud 29 (i.e. forms a telescopic fit into the cavity 11 of the shroud 29). As such, the extension portion 49 is also oblong in profile in the detailed embodiment. As will be evident to the skilled addressee, an alternate shape could be employed for the funnel member as required to suit the shape of the shroud.

The funnel member 35 includes a head portion 51 that is disposed at an end of the extension portion 49. The head portion 51 is configured to extend (project) from the shroud 29. The head portion 51 has a cross sectional area that is equal to or greater than the cross sectional area of the shroud 29, and is configured to sit against an end of the shroud 29 (i.e. the head portion protrudes from the shroud). The head portion 49 includes a lip 53 that extends perpendicular to the longitudinal axis A of the body, and a curtain portion 55 that projects from the lip 53 parallel to the longitudinal axis A of the body. The curtain portion 55 and lip 53 extend around the circumference of the shroud 29. The curtain 55 and lip 53 of the head portion 51 together form a recess configured to receive the second end 33 of the shroud 29 (i.e. the end 33 of the shroud 29 sits in the recess formed between the curtain 55 and lip 53 of the head portion 51).

The head portion 51 and extension portion 49 include a channel 57 formed therethrough that forms part of the cavity 11 of the body 3, the channel being configured to receive the chain loop in use. The head portion 51 is open at a first end 59 of the head portion 51 such that the channel 57 of the head portion 51 is able to receive the chain loop from the extension portion 49, and is open at a second end 61 of the head portion 51 such that the chain loop extends from head portion 51. The head portion 51 and extension portion 49 include a guide member 63 that is configured to guide the chain loop in use. The guide member 63 is disposed centrally in the channel 57, and extends along the longitudinal axis A of the body. The head portion 51 and extension portion 49 also include curved and opposed inner walls 65*a,b* that narrow the channel 57 adjacent the rotatable member and guide the chain from the head portion 51. The curved inner walls 65*a,b* assist to inhibit the links of the chain from lifting from (ensure engagement with) the rotatable member as the chain leaves and enters the rotatable member (towards and from the head portion 51 in use).

Figure 4:
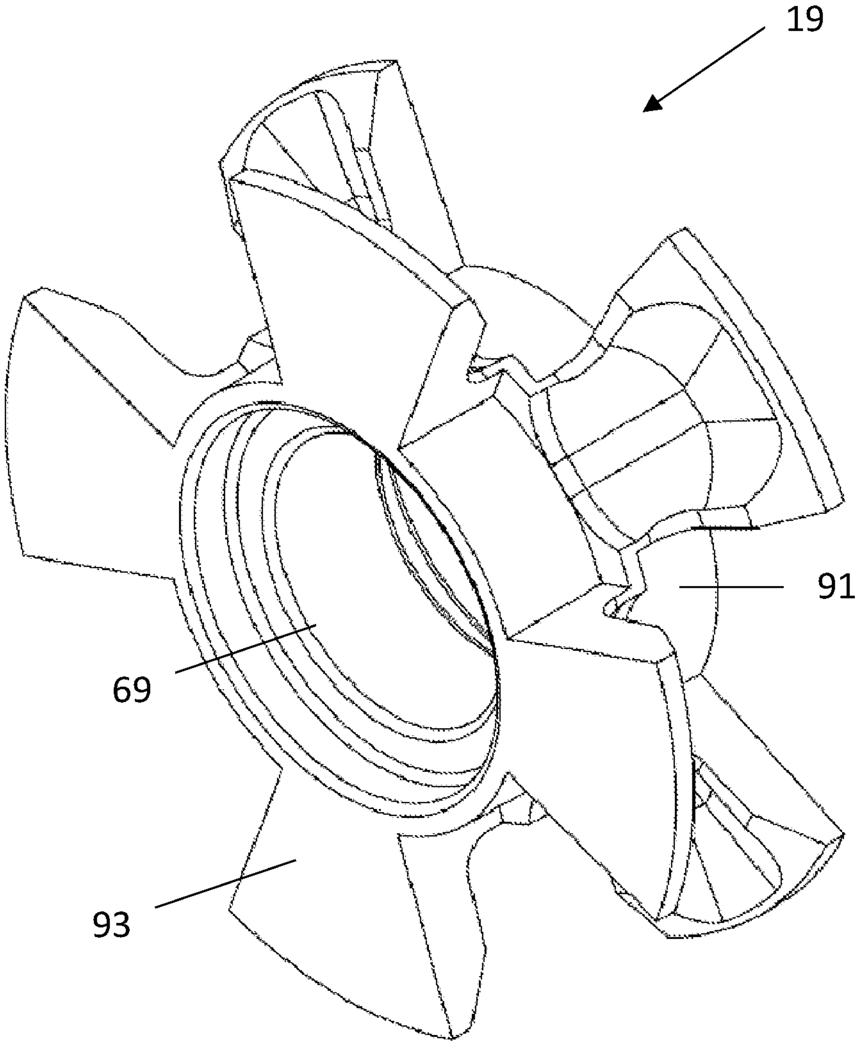
FIG. 4 shows a perspective view of a first embodiment of the rotatable member.

The extension portion 49 includes a support 67 configured to support the rotatable member. FIG. 4 provides a perspective view of a first embodiment of the rotatable member 19.

The rotatable member 19 includes a first aperture 69 formed therethrough. The shroud 29 includes a second aperture (not shown) formed therethrough. The first 69 and second apertures are disposed along an axis of rotation of the rotatable member 19 (the axis of rotation is perpendicular to axis A, shown in FIG. 3).

Figure 5:
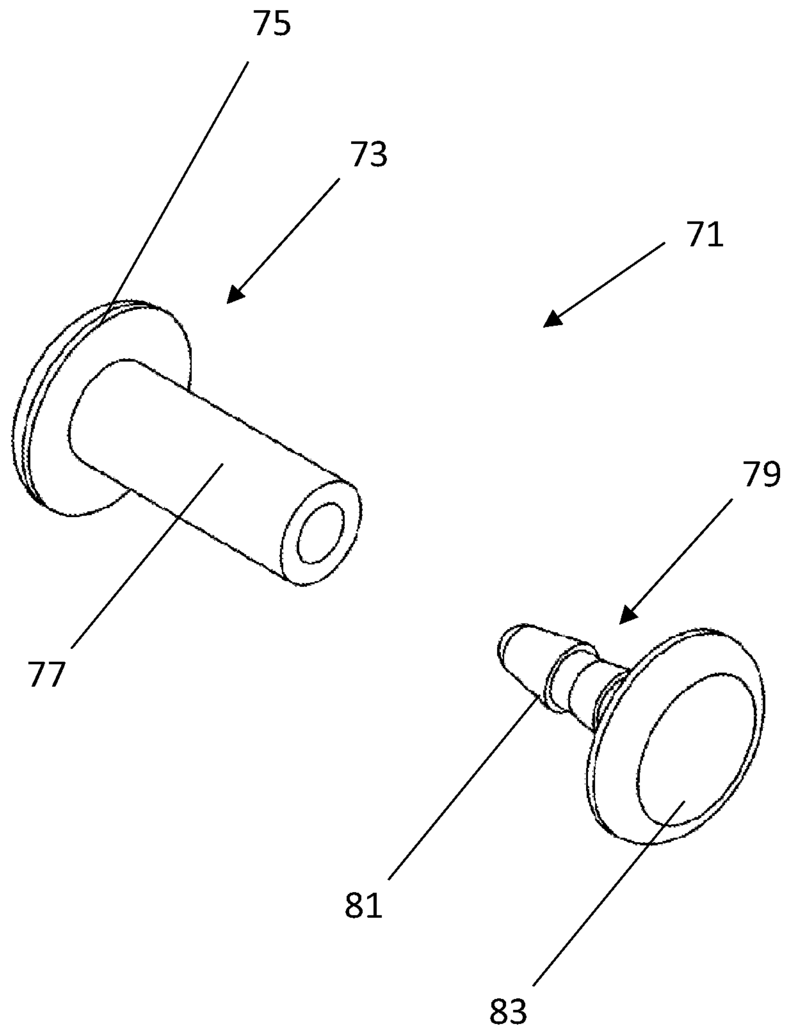
FIG. 5 shows an exploded view of the press fit binding post.

The system includes a press fit binding post that retains the rotatable member within the funnel member 35. FIG. 5 provides an exploded view of the press fit binding post 71. The biding post 71 includes a first portion 73 having a head 75 and tubular pin 77, and a second portion 79 having a post 81 configured to be received by the tubular pin 77 and a head 83. The first 73 and second 79 portions of the binding post 71 together extend through the first 69 and second apertures and thereby rotatably mount the rotatable member 19 to the body 3 (or in this case the funnel member 35 and the shroud 29 that together form the body 3). This arrangement enables the system to be easily retrofitted to the chain of a chain operated blind system. As will be evident to the skilled addressee, alternate mounting means are able to be employed to rotatable mount the rotatable member 19 to the funnel member 25 and shroud 29.

The support 67 of the extension portion 49 (see FIG. 3) is circular in profile, and the second aperture of the shroud 29 is disposed through the support 67 (i.e. the aperture through the shroud 29 and extension portion 49 of the funnel member 35 are coincident with one another to receive the press fit binding post).

Figure 6:
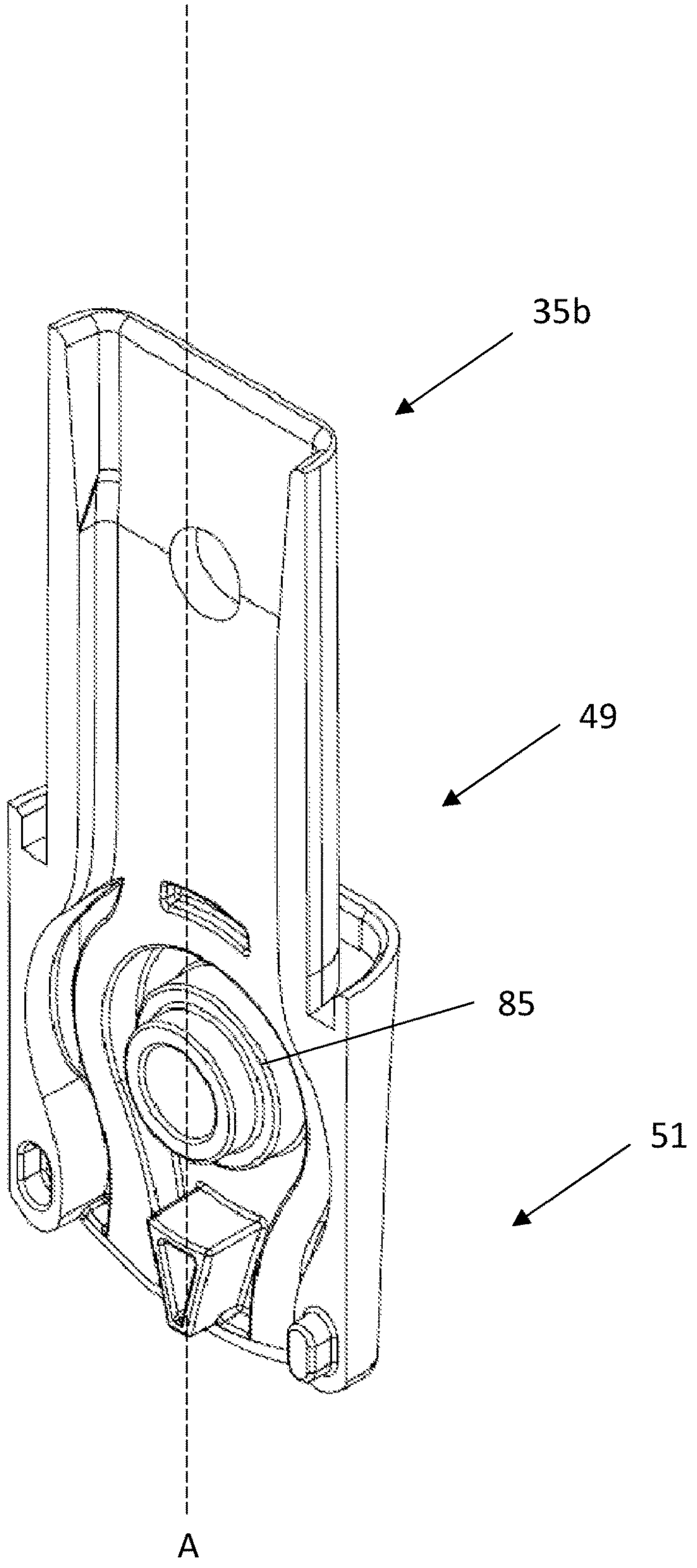
FIG. 6 shows a cross sectional front view of a second embodiment of the funnel member.

A second embodiment of the funnel member 35*b* is shown in FIG. 6, which provides a cross sectional view through the funnel member 35*b*. The structure of the second embodiment of the funnel member 35*b* is similar to the first embodiment of the funnel member 35 (FIG. 3). Like components are identified with the same indicia. In the second embodiment it is the head portion 51 that houses the rotatable member. As such, the rotatable member is disposed outside of the shroud 29. In order to house the rotatable member, the head portion 51 comprises a seat 85 configured to support the rotatable member. The seat 85 is circular in profile. In this embodiment, the second aperture of the body is coincident with an aperture formed through the extension portion 49, which may be fixed to the shroud 29 using the press fit binding post described with reference to FIG. 5.

In the embodiments disclosed above, the funnel member 35*b* is disposed at the proximal 7 end (see FIG. 1) of the body 3 (i.e. is connected to the top of the shroud 29). In an alternate embodiment, the first or second embodiment of the funnel member 35 and 35*b* may be mounted to the distal end 7 (see FIG. 1) of the body 3 (i.e. connected to the bottom of the shroud 29). The Applicant has determined that this arrangement is quieter in use relative to an arrangement that includes the funnel member at the bottom of the shroud (e.g. less chain noise).

Figure 7:
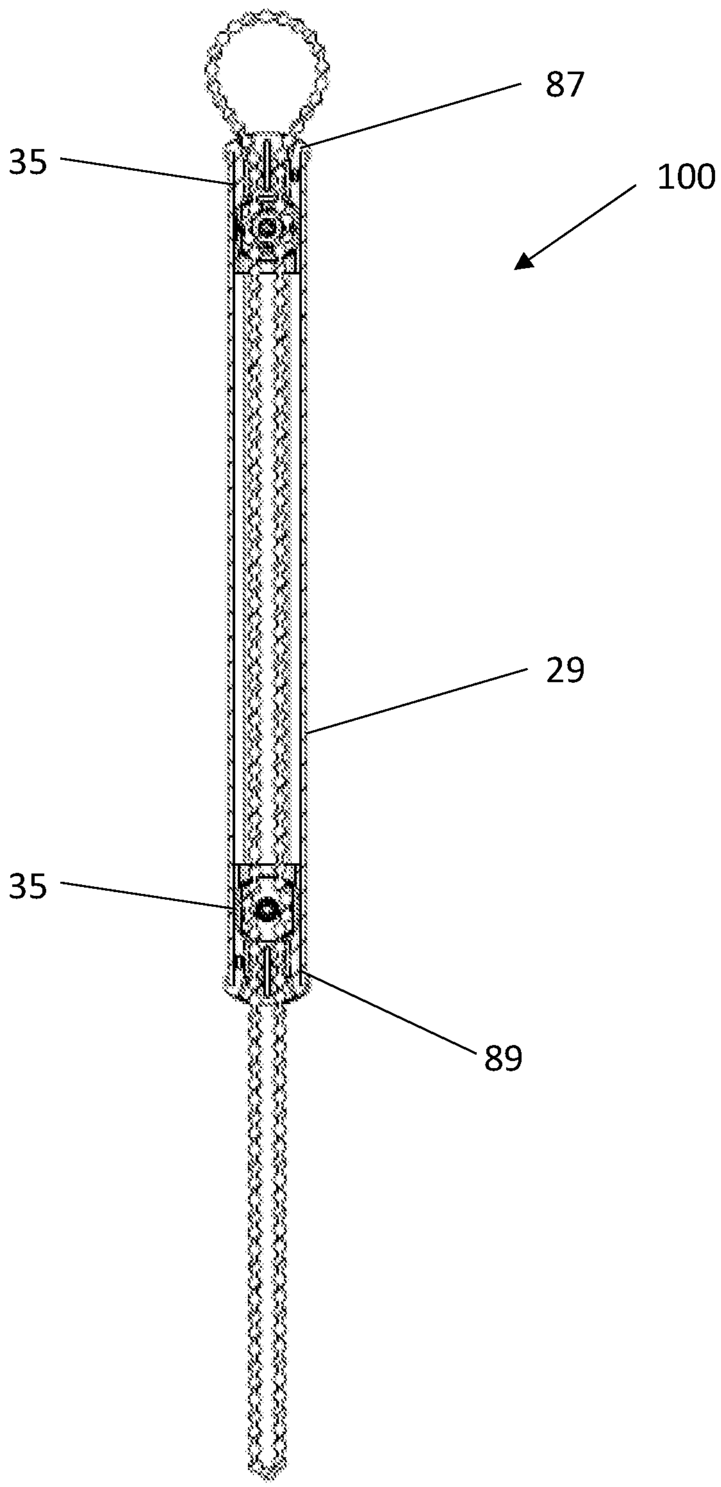
FIG. 7 shows a cross sectional front view of a second embodiment of the chain protection system according to the present disclosure.

Another embodiment of the chain protection system 100 is disclosed with reference to FIG. 7, which provides a cross sectional front view of chain protection system according to a second embodiment of the present disclosure. Like components are again identified with the same indicia. This embodiment includes a funnel member 35 mounted to an end 87 of the shroud 29 that is disposed towards the drive means of the chain driven blind assembly in use (i.e. at the top of the shroud 29), and a second funnel member 35 mounted to an end 89 of the shroud that is disposed away from the drive means of the chain driven blind assembly in use (i.e. at the bottom of the shroud 29). The embodiment shown in FIG. 7 includes funnel members 35 in accordance with that disclosed with respect to FIG. 3. As will be evident to the skilled addressee, funnel members 35*b* in accordance with that disclosed with respect to FIG. 6 could also be used (or a combination of both funnel members to suit a particular installation). As will also be evident to the skilled addressee, the rotatable member could also be mounted directly to the shroud 29 (i.e. without the need for a separate component, being the funnel member 35).

Returning to FIG. 4, a first embodiment of the rotatable member, in the form of a wheel 19, will now be described in further detail. The wheel 19 includes a mounting portion 91 and a plurality of chain receivers 93 that are integrally formed with and extend from the mounting portion 91. The chain receivers 91 are configured to receive a link of the chain loop and to thereby rotate the wheel 19 upon operation of the chain loop. The plurality of chain receivers 91 are evenly spaced about a circumference of the mounting portion 91. The plurality of chain receivers 91 are disposed adjacent an inner wall of the elongate portion of the funnel member 35 (for the first embodiment of the funnel member 35 whereby the wheel is disposed within the shroud 29) to prevent the chain loop from passing the wheel 19 without rotating the wheel 19.

Figure 8:
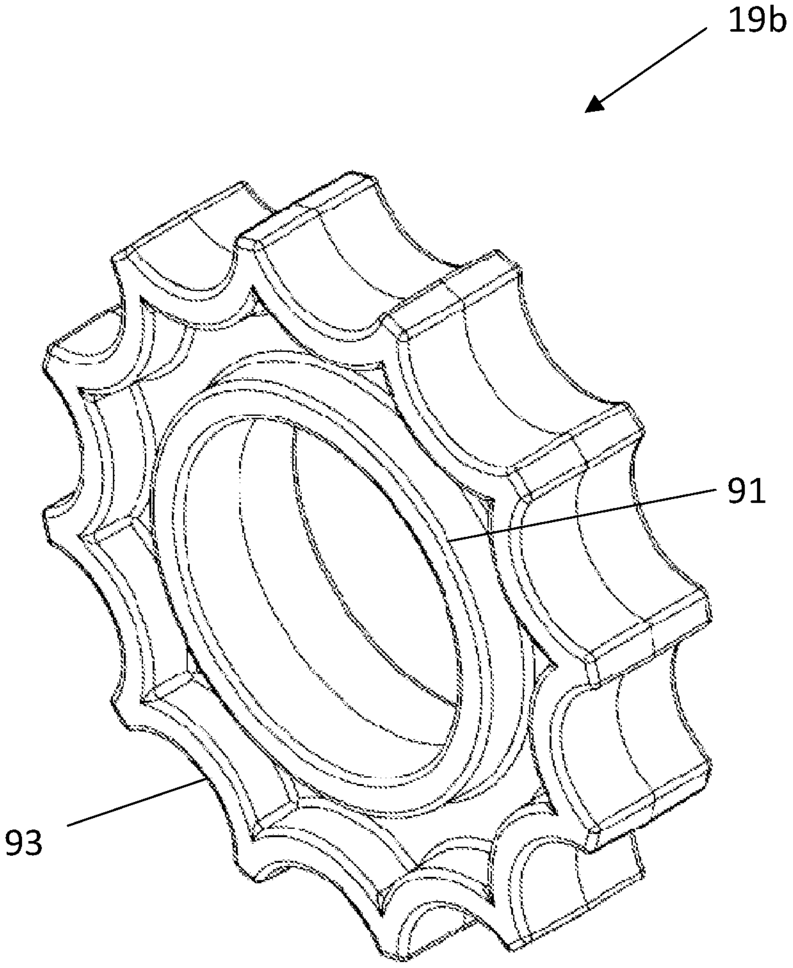
FIG. 8 shows a perspective view of the second embodiment of the rotatable member.

A second embodiment of the wheel 19*b* is shown in FIG. 8, which provides a perspective view of the second embodiment of the wheel 19*b*. Like functional components are identified with the same indicia. The second embodiment of the wheel 19*b* is configured to operate with the second embodiment of the funnel member 35*b*, and has a greater diameter relative to the first embodiment of the wheel.

In the detailed embodiment, the shroud is formed from PVC material. In another embodiment, the shroud is formed from extruded aluminium. Other materials could be used to suit particular applications. In the detailed embodiment, the wheel is formed from a plastic material to reduce chain noise during operation. Other materials could be used to suit particular applications. In the detailed embodiment, the funnel member is formed from polycarbonate material (allows clear material or coloured material) or a soft touch plastic (e.g. polyurethane) coloured only to reduce chain noise. Other materials could be used to suit particular applications. In the detailed embodiment, the post is formed from plastic or metal (e.g. a Chicago screw). In the detailed embodiment, the post is tamper proof so that it cannot be accidently removed from the chain.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

What is claimed is:

1. A chain protection system for a chain driven blind assembly comprising a drive means and a chain loop, a proximal end of the chain loop being coupled to a rotatable chain-engaging element of the drive means, the chain loop hanging downwardly from the drive means, the system comprising:

an elongate body that extends along a longitudinal axis of the body between proximal and distal ends of the body, the body comprising an outer wall that defines a cavity therein, the cavity being configured to house a first portion of the chain loop which is disposed adjacent the proximal end of the chain loop, the proximal end of the body being located adjacent to and beneath the drive means when the chain protection system is installed on the chain loop of the blind assembly, such that the first portion of the chain loop is concealed within the cavity and thereby inhibited from operation by a user's hand; and a rotatable member mounted within the cavity of the body, the rotatable member being configured to engage with the first portion of the chain loop, wherein a second portion of the chain loop hangs freely below the distal end of the body when the chain protection system is installed on the blind assembly such that the second portion of the chain loop is freely accessible by a user's hand to operate the chain loop.

2. A chain protection system according to claim 1, wherein the chain loop engages first and second opposing sides of the rotatable member such that the second portion of the chain loop remains a consistent length during operation.

3. A chain protection system according to claim 2, wherein the rotatable member is mounted in a fixed position within the cavity of the body, and the chain loop engages the first side of the rotatable member, extends below the distal end of the body, and returns to engage the second side of the rotatable member.

4. A chain protection system according to claim 3, wherein the rotatable member comprises a first aperture formed therethrough, and the body comprises a second aperture formed therethrough, the first and second apertures being disposed along an axis of rotation of the rotatable member, and wherein a pin extends through the first and second apertures and thereby rotatably mounts the rotatable member to the elongate body.

5. A chain protection system according to claim 1, wherein the elongate body comprises a shroud extending between first and second ends of the shroud, and a funnel member mounted to the first or second end of the shroud.

6. A chain protection system according to claim 5, wherein the shroud comprises a first wall, a second wall spaced from and parallel to the first wall, a third wall connecting the first and second walls on a first side of the shroud, and a fourth wall connecting the first and second walls on a second side of the shroud, and wherein the first, second, third and fourth walls of the shroud surround a first portion of the cavity of the elongate body.

7. A chain protection system according to claim 6, wherein the first and second walls of the shroud are flat, and the third and fourth walls of the shroud are curved, such that the profile of the shroud is oblong.

8. A chain protection system according to claim 6, wherein the funnel member comprises:

an extension portion having a cross sectional area that is smaller than a cross sectional area of the shroud, the extension portion being configured to be received by the shroud; and a head portion that is disposed at an end of the extension portion, the head portion being configured to extend from the shroud.

9. A chain protection system according to claim 8, wherein the head portion has a cross sectional area that is equal to or greater than the cross sectional area of the shroud, the head portion being configured to sit against an end of the shroud.

10. A chain protection system according to claim 9, wherein the head portion comprises a lip that extends perpendicular to the longitudinal axis of the body, and a curtain portion that projects from the lip parallel to the longitudinal axis of the body, wherein the curtain portion and lip of the head portion together form a recess configured to receive an end of the shroud.

11. A chain protection system according to claim 10, wherein the head portion and extension portion comprise a channel formed therethrough that forms part of the cavity of the body, the channel being configured to receive the chain loop, and wherein the head portion is open at a first end of the head portion such that the channel of the head portion is able to receive the chain loop from the extension portion, and is open at a second end of the head portion such that the chain loop extends from head portion.

12. A chain protection system according to claim 11, wherein the head portion and extension portion comprise a guide member disposed centrally in the channel, the guide member extending along the longitudinal axis of the body and configured to guide the chain loop in use.

13. A chain protection system according to claim 8, wherein the extension portion comprises a support configured to support the rotatable member, wherein an aperture is disposed through the support and a pin extends therethrough to thereby rotatably mount the rotatable member to the support.

14. A chain protection system according to claim 8, wherein the head portion comprises a seat configured to support the rotatable member and a pin extends through the extension portion to mount the funnel member to the shroud.

15. A chain protection system according to claim 5, wherein the funnel member is mounted to an end of the shroud that is disposed towards the drive means of the chain driven blind assembly in use.

16. A chain protection system according to claim 5, wherein the funnel member is mounted to an end of the shroud that is disposed away from the drive means of the chain driven blind assembly in use.

17. A chain protection system according to claim 5, comprising a further funnel member, wherein a first of the two funnel members is mounted to an end of the shroud that is disposed away from the drive means of the chain driven blind assembly in use, and the second of the two funnel members is mounted to an end of the shroud that is disposed towards the drive means of the chain driven blind assembly in use.

18. A chain protection system according to claim 1, wherein the rotatable member comprises a mounting portion and a plurality of chain receivers that are integrally formed with and extend from the mounting portion, the chain receivers each being configured to receive a link of the chain loop and to thereby rotate the rotatable member upon operation of the chain loop.

19. A chain protection system according to claim 18, wherein the plurality of chain receivers are evenly spaced about a circumference of the mounting portion and are disposed adjacent an inner wall of the body to prevent the chain loop from passing the rotatable member without rotating the rotatable member.

* * * * *